(12) United States Patent
Brandstetter et al.

(10) Patent No.: US 9,742,856 B2
(45) Date of Patent: Aug. 22, 2017

(54) AIDED PASSIVE LISTENING

(71) Applicant: Buzzmark Inc., Washington, DC (US)

(72) Inventors: Matthias Brandstetter, Vienna (AT); Roland Pickl, Vienna (AT); Mathias Entenmann, Munich (DE)

(73) Assignee: Buzzmark, Inc., Washington, DC (US)

( * ) Notice: Subject to any disclaimer, the term of this patent is extended or adjusted under 35 U.S.C. 154(b) by 0 days.

(21) Appl. No.: 14/984,476

(22) Filed: Dec. 30, 2015

(65) Prior Publication Data

US 2016/0226990 A1    Aug. 4, 2016

Related U.S. Application Data

(60) Provisional application No. 62/097,787, filed on Dec. 30, 2014.

(51) Int. Cl.
*H04L 29/08* (2006.01)
*G06Q 30/02* (2012.01)
*H04W 4/02* (2009.01)

(52) U.S. Cl.
CPC ......... *H04L 67/26* (2013.01); *G06Q 30/0261* (2013.01); *H04L 67/20* (2013.01); *H04L 67/18* (2013.01); *H04W 4/023* (2013.01)

(58) Field of Classification Search
CPC ... G06Q 30/0261; H04W 4/023; H04L 67/26; H04L 67/20; H04L 67/18
See application file for complete search history.

(56) References Cited

U.S. PATENT DOCUMENTS

| | | | |
|---|---|---|---|
| 8,138,930 B1* | 3/2012 | Heath | G01W 1/00 340/540 |
| 2008/0256115 A1* | 10/2008 | Beletski | G06F 17/30056 |
| 2014/0172429 A1* | 6/2014 | Butcher | G10L 19/018 704/270 |
| 2015/0287107 A1* | 10/2015 | Alakoye | G06Q 50/01 705/14.73 |
| 2016/0192073 A1* | 6/2016 | Poornachandran | G10L 25/51 381/26 |
| 2016/0269841 A1* | 9/2016 | Shinde | G08B 1/08 |

* cited by examiner

*Primary Examiner* — Devan Sandiford
(74) *Attorney, Agent, or Firm* — Ziegler IP Law Group, LLC

(57) ABSTRACT

An aided passive listening system is configured to identify an audio signal using a listening mobile communication device enabled with a listening application; identify one or more other mobile communication devices within a predetermined distance of the listening mobile communication device that are enabled with the listening application; and push an action associated with the audio signal to the listening mobile communication device and the one or more other mobile communication devices within the pre-determined distance.

12 Claims, 7 Drawing Sheets

AIDED PASSIVE LISTENING

FIELD

The aspects of the present disclosure generally relates to mobile communication devices, and more particularly to the distribution of notifications or other messages to mobile communication devices.

BACKGROUND

With the advent of the Internet, off-line information is able to be accessed in the on-line environment. Advances in mobile communication technology provide the ability to push on-line information to mobile communication devices. With the expansive use of mobile communication technology and mobile communication devices, the ability to push data and information in various forms, such as advertising and marketing, can be realized. This information can be pushed directly to a user's mobile communication device, such as a smart phone.

Certain applications for mobile communication devices provide for enabling the mobile device to detect and identify certain audio signals. For example, there are applications for mobile devices that will identify music when the device is listening to a song. The mobile device listens to the song, and is able to pull information from a central server(s) via the Internet that will identify the title of the song as well as the artist of the song.

These types of applications are limited in the sense that when the application is running, the use of the mobile device is limited and the battery consumption is increased. For example, when a listening application is active or enabled on the mobile communication device, the audio listening portion of the mobile communication, such as the microphone, needs to be on or active. During the time when the listening application is on or active, the microphone will not be able to be used for other purposes, such as a voice call (unless the operating system of the mobile device prioritizes phone calls over all other applications).

When applications of a mobile device are running, the battery consumption increases. Since battery consumption on mobile devices is limited, it is not desirable to continuously run applications that will contribute to the drain on the battery. It would be advantageous to be able to limit the extent of the use of applications, functions and other devices of a mobile communication device in order to increase the battery charge or life but still be able to receive notifications that are linked to the use of such applications.

Notifications, and push notifications are commonly used in mobile communication system and devices to provide information. These might generally be referred to as "smart phone app notifications." In a typical smart phone, a notification is received by the smart phone and is be indicated by an icon in a notification screen or panel of the user interface or display of the mobile communication device. The notification icons are generally unique to the underlying application. In some instances or applications, the notification can be accompanied by some audible aspect as well. Notifications can appear in many different forms.

For example, in certain ANDROID™ based devices, the notification icon will appear as a small symbol or logo in an upper left hand corner of the display. When such a notification icon is presented, the user can typically open the notification panel and tap on the respective icon, as is generally understood. The tapping on the icon will result in the opening of the application. In other instances, the user can go directly to the relevant application icon and open the application from there.

Generally, in order to receive notifications relevant to an application enabled on the mobile communication device, the application has to be running and the device configured or subscribed to receive such notifications. For example, to receive email notifications, the email application will be enabled or active. Typically, the email application will be configured to periodically ping the email server to obtain such notifications. To receive news feeds, the news feed application on the mobile device will be enabled and periodically pull down updated information. Alternatively, the updated information can be pushed to each device that has the particular news application enabled.

However, in the case of a listening application, as noted before, when the listening application is running, or listening, there is a battery drain and the microphone is blocked from other use. If the listening application is not running or not listening, there is the possibility that the mobile device will not receive relevant notifications that it would otherwise receive if the listening application was actively enabled.

There are also situations where the operating system of a mobile communication device does not provide for, or enable, background listening. Thus, those types of devices will not be able to participate in such programs where background listening is required.

Accordingly, it would be desirable to provide a mobile device and notification system for a mobile device that addresses at least some of the problems identified above.

SUMMARY

As described herein, the exemplary embodiments overcome one or more of the above or other disadvantages known in the art.

One aspect of the exemplary embodiments relates to an aided passive listening system. In one embodiment, the aided passive listening system is configured to identify an audio signal using a listening mobile communication device enabled with an active listening application; identify one or more other mobile communication devices within a predetermined distance of the listening mobile communication device that are enabled with the listening application in a non-listening mode; push an action associated with the audio signal to the listening mobile communication device and the one or more other mobile communication devices in the non-listening mode that are within the predetermined distance of the listening mobile communication device.

Another aspect of the exemplary embodiments relates to a mobile communication device in communication with an application server. A listening application is downloaded and stored to the mobile communication device. The mobile communication device includes an audio detection device that is configured to detect and identify audio signals. A processor in the mobile communication device is configured to determine if an audio signal detected by the audio detection device corresponds to a pre-determined audio signal. The processor then causes the mobile communication device to communicate with an application server. The application server is configured to identify an action associated with the pre-determined audio signal and push that action to the mobile communication device.

The mobile communication device is also configured to transmit its location information, obtained from a location device in the mobile communication device to the application server, assuming that the location services of the mobile device have not been disabled and that the user has granted the right to use the location to the listening application. For the further usage of the location it is assumed that the location services of the mobile devices are enabled and that the rights to use the location were granted to the aided passive listening application. The application server then compares that location information to location information obtained from other mobile communication devices that are enabled with the listening application, the listening application being in a non-listening mode in the other mobile communication device. If the other mobile communication devices are within a pre-determined area of the mobile communication device, the application server will transmit actions to those other mobile communication devices within the pre-determined area of the mobile device.

In a further aspect of the disclosed embodiments when one mobile device with a "listening application" detects/identifies a certain audio signal, then this device will report the fact that it just detected something and it's current location back to the server. The server on a regular basis gets back all the locations from all the devices which have the "listening application" installed. The server system now checks which other applications are within a predefined distance of the one which identified an audio. Such distances could as examples be 6, 10, or 20 meters. All the devices which are within the set distance to the device which identified an audio, will now receive the same notification & actions as the one device which identified the audio.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

DETAILED DESCRIPTION OF THE EXEMPLARY EMBODIMENTS OF THE DISCLOSURE

Figure 1:
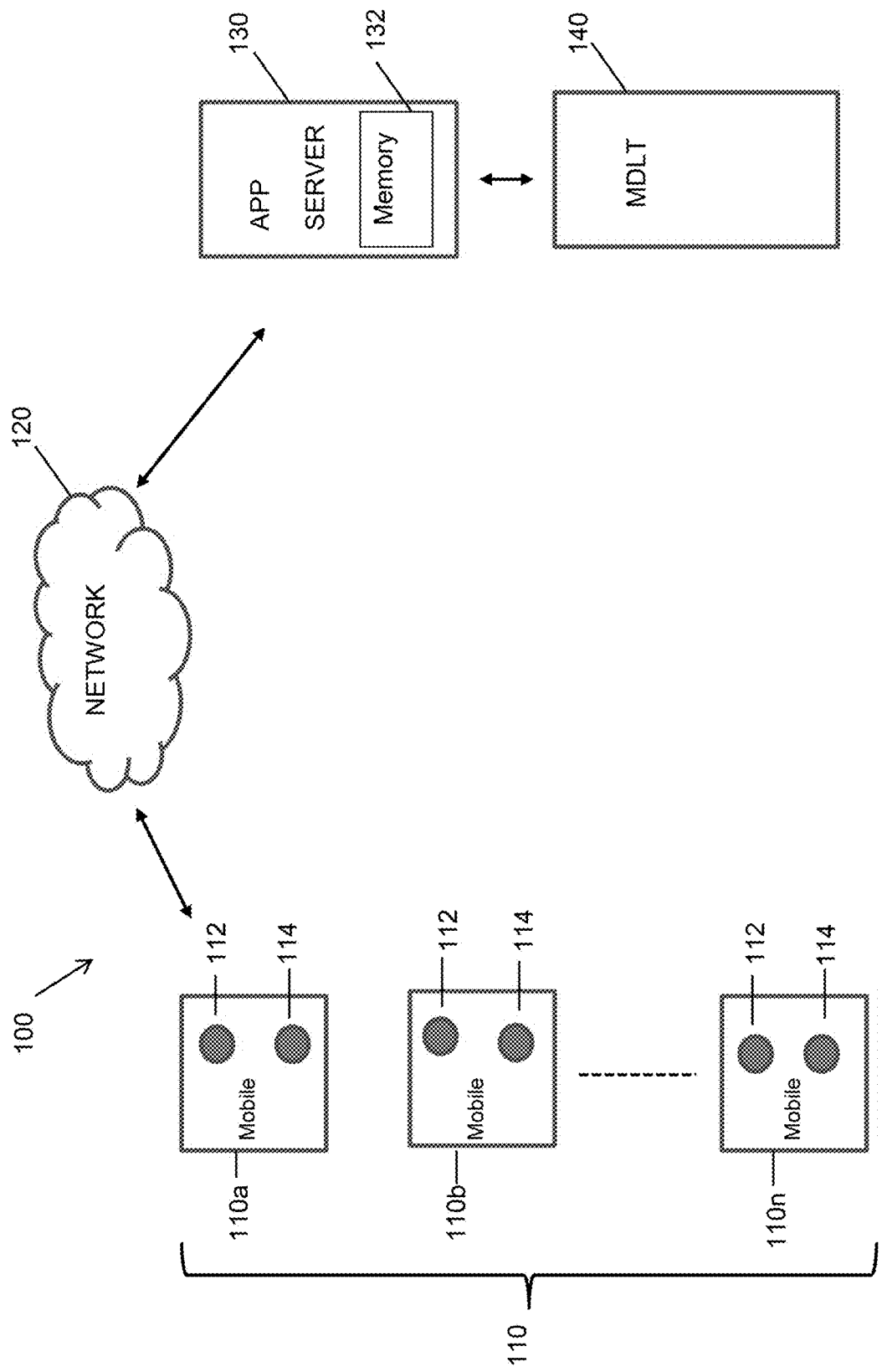
FIG. 1 is a block diagram of an exemplary system architecture incorporating aspects of the present disclosure.

Referring to FIG. 1, an exemplary architecture for a mobile communication system 100 incorporating aspects of the disclosed embodiments is illustrated. The aspects of the disclosed embodiments are directed to a system 100 that enables one "listening" device to detect an audio signal and for other "non-listening" devices within a certain distance of the "listening" device, to receive a notification associated with detected audio signal. Thus, devices that do not explicitly detect the audio signal can receive the same notification as if they had detected the audio signal.

FIG. 1 is a block diagram of an exemplary system and architecture for implementing the aspects of the disclosed embodiments described herein. As shown in FIG. 1 the system 100 will include one or more mobile communication devices 110, also referred to individually as mobile communication devices 110*a* to 110*n*. The number of mobile communication devices 110 that can be implemented or used in conjunction with the system 100 is not limited by the scope of the present disclosure. Rather, any suitable or desired number of mobile communication devices 110 can be included. For the purposes of the disclosure herein, the "listening" mobile communication device 110 will be referred to as mobile communication device 110*a*, while the other "non-listening" mobile communication devices 110 are identified as 110*b*-110*n*, of which there can be any suitable number. Although only a single listening mobile device 110*a* will be generally referred to herein, it will be understood that the system 100 can include more than one listening mobile device 110*a*.

The mobile communication devices 110 are coupled to the communication network 120, as is generally understood, typically using a wireless communication connection such as a cellular connection or WIFI™ connection. For the purposes of the disclosure herein, the term "mobile communication device" will be used to refer to and include any device that is enabled for mobile and wireless communication over a network such as the Internet or a cellular communication network. This can include for example, mobile telephones, smart phones, tablets, pads, phablets, smart computing devices, watches and other mobile communication and computing devices generally.

The communication network 120 can include any suitable communication network, including for example, a cellular communication network, wide area local network, or the Internet. The network 120 will generally enable the receipt and transmission of communications in the form of data and information to and between the mobile communication devices 110 and other systems and entities, as is generally understood.

The network 120 is communicatively coupled to an application service or server system 130. The application server system 130 can include or is coupled to one or more memory devices 132. Although the memory device 132 is shown as part of the server system 130, in alternate embodiments, the memory device 132 can comprises one or more standalone memory devices. The memory device 132 can also be coupled to the application server 130 through the "cloud", as that is generally understood.

In one embodiment, the application server system 130 is generally configured to store "content" in the memory device 132 and to relate or link the stored content to one or more audio signals in a suitable fashion. The term "content" as it is used herein generally refers to events, actions and activities that include, but are not limited to, messages of all kinds, advertising, promotions, games, sweepstakes, and the distribution of prizes, coupons and vouchers, among other things. For example, in one embodiment, the content can include an advertisement, a coupon or a prize, or link thereto. If the user clicks on the link, the user is directed to the content. In the case of a coupon, the user could present it at a store for use. In the case of a prize, the user can present the digital image on the mobile device at the store or venue to redeem the prize.

The content can be stored in the form of a data object or script that can be downloaded to a mobile device 110 and executed by the mobile device 110 to perform the associated function, whether that involves playing a game on the device 110 or opening a link to a web page. The pre-determined or saved audio signals can also be stored in a library or database of audio signals that is stored in the memory 132, or is accessible by the server 130 through the network 120.

The mobile communication device 110 of the disclosed embodiments, and in particular, the listening mobile communication device 110a, is configured to detect and identify audio signals by listening for audio signals. For the purposes of the disclosure here, in an "active" listening mode of the mobile device 110a, the mobile device 110a will listen for and detect audio signals.

As shown in FIG. 1, in one embodiment, the mobile devices 110 will include one or more audio detecting or audio input devices 112, such as a microphone, for example. The audio detecting device 112 will be configured to detect the audio signals. Although the mobile devices 110 shown in FIG. 1 are illustrated as being equipped with, or including, only one audio detecting device 112, it will be understood that the mobile devices 110 can include one or more audio detecting devices 112.

It should be noted that the aspects of the disclosed embodiments do not require the non-listening mobile devices 110b-110n to have audio detecting devices 112. A mobile device 110b-110n without an audio detecting device 112 can still receive the notification. The aspects of the disclosed embodiments provide for a mobile device 110 to receive a notification even if the mobile device 110 is not listening for the audio signal that is linked to the notification. Only one listening mobile device 110a is needed to detect the audio signal. Once the audio signal is detected and identified, all other mobile devices 110b-110n within a pre-determined region or area can receive the notification.

For example, in one embodiment, the mobile communication device 110a detects an audio signal. The device 110a reports the detection of the audio signal to the application server 130, together with its current location. The application server 130 will determine that the audio signal is associated with a notification, or action. This can include for example, the delivery of content to the mobile communication device 110a. In one embodiment, the content can include a communication or message, also referred to herein as a "notification" that can be acted upon by the user or operator of the mobile communication device 110a.

In one embodiment, the application server 130 is aware of a location of other mobile device 110b-110n that are equipped with the listening application of the disclosed embodiments, and are within a certain distance or area of the listening mobile device 110a. The mobile devices 110b-110n that are within a pre-determined distance of the mobile device 110a will receive the same notifications and action as the mobile device 110a.

The aspects of the disclosed embodiments allow one mobile communication device, referred to herein as a "listening" mobile communication device, to "hear" an audio signal and then enable the distribution of the "content" or notification associated with that audio signal to other, "non-listening" mobile communication devices 110b-110n within a pre-determined distance of the listening mobile communication device 110a. The term "distance" as used herein can also be described as an "area" or "region." This allows for the dissemination of information and data over a broad area even when certain devices are not actively "listening" for audio and other data signals, thereby minimizing power and resource usage.

In accordance with the aspects of the disclosed embodiments, when an audio signal is detected and identified by the listening mobile device 110a, the audio signal can be matched with one or more pre-determined audio signals, such as audio signals, or representations thereof, stored in the server system 130. Examples of the audio signals can include, but are not limited to, songs, jingles, phrases, and words. In some cases, the audio signals can be associated with one or more promotions and advertising campaigns, as is generally described herein or understood. While the term "audio signals" is used herein to generally refer to audible audio signals, the aspects of the disclosed embodiments are not so limited. In some cases audio or data signals that are not audible, or not within the frequency spectrum of audio signals that can be heard or perceived by the human ear, may be also be transmitted and detected by a mobile communication device 110. The aspects of the disclosed embodiments can include such signals and data communications. In one embodiment, the audio signals can include multi-media types of signals.

In one embodiment, the server system 130 can include a table or database that associates a pre-determined audio signal with content. The associated content, or a link thereto, can then be transmitted to the mobile device 110a. Generally, the associated content or link thereto is transmitted to the mobile communication device 110a in the form of a "notification", as that term is generally understood. In alternate embodiments, the content can be transmitted or delivered to the mobile communication device 110a in any suitable manner.

In one embodiment, the notification can be associated with an application stored on the mobile communication devices 110. For example, once the notification is received, the user can "click" on or touch the notification icon or notification message on the display of the user interface to open or view the associated content. Alternatively, receipt of the notification by the device 110 can automatically launch the application. The user can also go directly to the associated application, where the content can then be accessed.

The notification can comprise any suitable format and be associated with any suitable application or application type. For example, the notification can be associated with applications that include for example, but are not limited to, email applications, SMS/text message applications, or other suitable messaging applications or systems. In alternate embodiments, the notification can be associated with one or more stand-alone applications stored on the mobile communication device 110, the stand-alone applications being configured to enable the user of the mobile device 110 to access the content associated with the notification.

The aspects of the disclosed embodiments provide for the dissemination of content that is associated with an audio signal not just to the "listening" mobile communication device 110a that detected or "heard" the audio signal, but also to other "non-listening" mobile communication devices 110b-110n within a pre-determined distance of the listening mobile communication device 110a that detected the audio signal. In one embodiment, the pre-determined distance can be, for example, approximately 6, 10 or 20 meters. However, the aspects of the disclosed embodiments are not so limited, and in alternate embodiments, any suitable distance is contemplated. While the aspects of the disclosed embodiments are generally described herein with respect to a defined area or confines of a venue, in some embodiments, the area can be large or over a wide geographical area. In this manner, only one mobile communication device 110a needs to be actively listening for audio signals. Other mobile communication devices 110b-110n do not need to be actively listening, but can still receive the notification. This advantageously allows the other devices to conserving power and resources in a non-active, or passive listening state or mode.

In one embodiment, the listening mobile communication devices 110a and the non-listening mobile communication devices 110b-110n will have installed thereon or be equipped with an aided passive listening application 114, also referred to herein as the "listening application." One or more of the server system 130 and the mobile communication device 110a will be able to identify other mobile communication devices 110b-110n that are equipped or loaded with the aided passive listening application 114. Once the other mobile communication devices 110b-110n that are equipped with the aided passive listening application 114 are identified, the listening mobile communication device 110a, through the server system 130, can "push" or cause the server system 130 to push, the content associated with the audio signal, to the other, non-listening, mobile communication devices 110b-110n. In one embodiment, only those devices 110b-110n that are equipped with the aided passive listening application 114 will be able to receive the content via the notification(s).

The aspects of the disclosed embodiments advantageously reduce or eliminate the need for all mobile devices 110 that have the listening application 114 of the present disclosure to be actively "listening" in order to be the recipient of the described notifications, or participate in the above described events and activities that are associated with the notifications. By reducing the need for a mobile device 110 to be actively listening, the aspects of the disclosed embodiments advantageously enable a reduction in power and resource consumption in a mobile device, such as battery consumption. Hardware and component use in the form of audio detection devices is minimized and not restricted and a more effective distribution of content is achieved.

Promotional or advertising campaigns will typical include the delivery of information and data to users, generally referred to herein as "content." The content is typically configured to engage the users to try the relevant product or service. For example, with respect to on-line promotions, a user might go to a website and play a game or engage in some other activity or sweepstakes in order to receive a prize. In some cases the user receives a message to go to the website or that they have received a coupon or prize. The coupon or prize might be in the form of a product sample. The idea is to engage the user to try the product or service.

In the field of mobile communication devices, such promotional and advertising campaigns can comprise the delivery of content to the mobile communication device. In a manner similar to on-line promotions, games, the content in the form of sweepstakes, coupons and vouchers can be presented on the mobile communication device. The users can interact with the content, such as by playing the game on the mobile communication device or enter in the sweepstakes. The result may be that the user is rewarded with a prize, coupon or voucher.

To enhance the reach and expanse of such promotional, advertising and marketing programs, it is desirable to reach as many users as possible. With respect to mobile communication devices, the aided passive listening application 114 of the disclosed embodiments can be downloaded and installed on an unlimited number of mobile communication devices 110. However, the drawbacks and deficiencies of maintaining the device 110 in a constantly listening mode as described earlier, may not be desirable since there is a high power consumption and the use of the microphone 112 of the device 110 can be blocked. Thus, while the listening application 114 may be downloaded and installed on an unlimited number of mobile communication devices 110, one or more of such listening enabled mobile communication devices 110 may not be listening when there is content available to be downloaded. This will limit the ability to transmit such content to such non-listening devices. The aspects of the disclosed embodiments advantageously enable "non-listening" mobile devices to gain the benefits realized when a listening mobile communication device detects and identifies an audio signal that has content associated therewith.

The aspects of the disclosed embodiments can also take advantage of audio identification processes and systems that are generally known in the art. Examples of such audio identification systems can include, but are not limited to, audio fingerprinting, audio watermarking, or other suitable signal identification technology. Certain existing audio signal identification technologies will enable a trigger or action when an audio sequence is identified. For example, when an audio signal is detected and identified, in some cases content, such as the name of the song and the artist can be displayed on the user interface of the listening device. As another example, when an audio sequence is identified, a game can be enabled to be played on the device. An example of this is presented in U.S. patent application Ser. No. 14/298,131, filed on 6 Jun. 2014, the disclosure of which is incorporated herein by reference in its entirety. A further example can be the sending of a message, a notification or other communication or action. An "action" as that term is used herein, can generally refer to some type of messaging, such as a smart phone notification, an email, SMS. The term "action" can also include the starting of an application, starting a game or playing a song.

In certain circumstances, it can be desirable to deliver content to mobile communication devices 110 that are in a certain area or location, also referred to as a venue. As is generally understood, location devices and location services enable the tracking of mobile communication devices 110. The aspects of the disclosed embodiments take advantage of the location services that are typically part of the mobile communication device or operating system. Examples of such services or systems can include, but are not limited to GPS, signal triangulation, Bluetooth™ NFC, WiFi™, iBeacons™ and RSSI™ fingerprinting. Generally, the mobile communication device 110 will know its position and location. The position of the mobile communication devices 110 can be used by other applications and services. In one embodiment, using location services, the application server system 130 can keep track of all mobile devices 110 that have the aided passive listening application 114 installed thereon.

The application server system 130 could also be communicatively coupled with a mobile device tracking and location system 140. The mobile device tracking and location system 140 can be configured to utilize location service data to monitor and track the locations of mobile devices 110 that are equipped with the aided passive listening application 114 of the disclosed embodiments.

By combining such audio identification and location technology with the aided passive listening application 114 of the disclosed embodiments, it is possible to create a system that overcomes the drawbacks of mobile communication devices needing to be actively listening in order to receive relevant or desired content.

Figure 2:
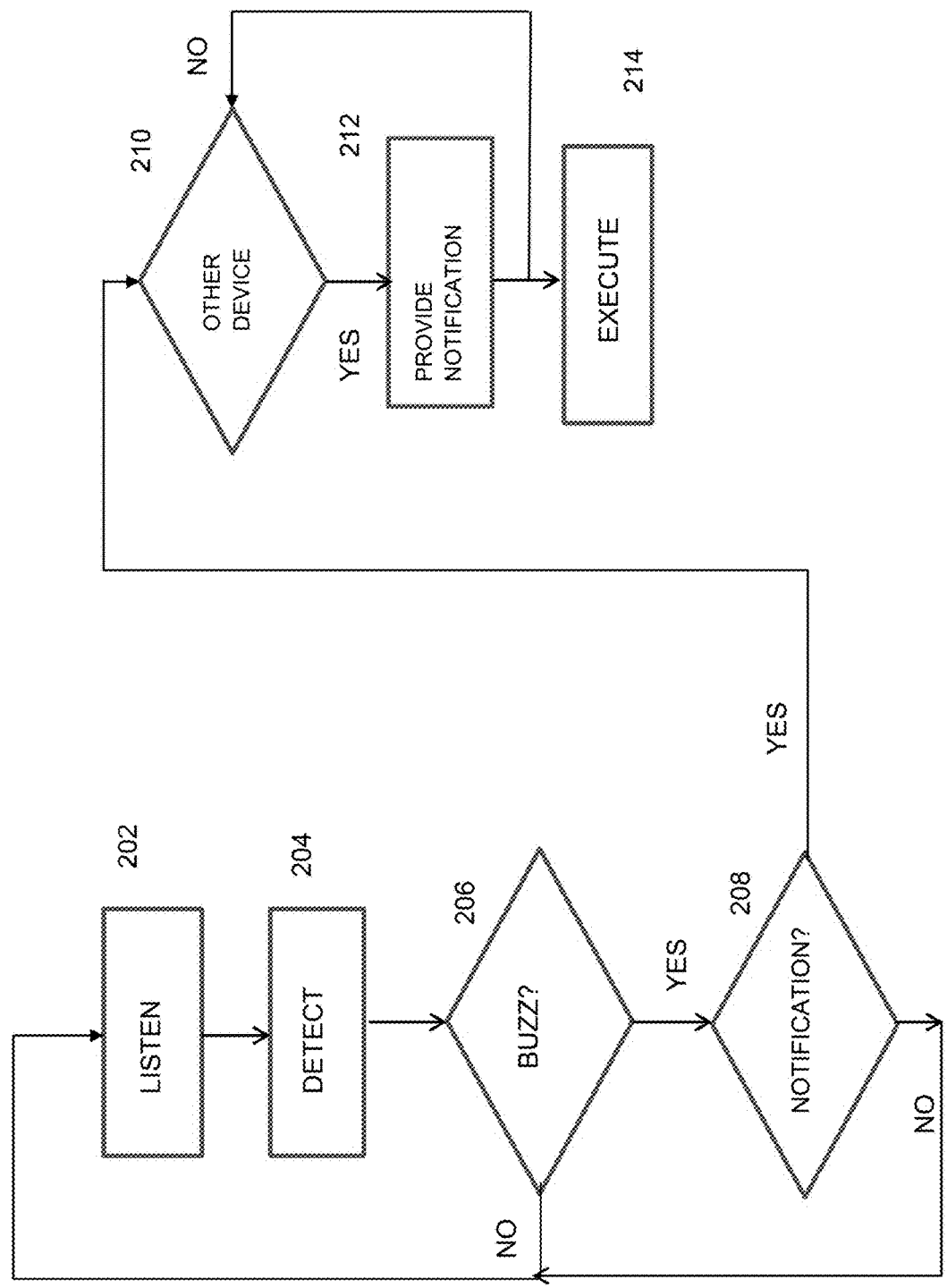
FIG. 2 is a flowchart of one embodiment of an exemplary process flow incorporating aspects of the present disclosure.

Referring to FIG. 2, one embodiment of a process incorporating aspects of the present disclosure is illustrated. One or more of the mobile devices 110 of FIG. 1 are equipped with the aided passive listening application 114 of the disclosed embodiments. The aspects of the disclosed embodiments find particular application when a plurality of mobile devices 110 are equipped the aided passive listening application.

The aided passive listening application 114 of the disclosed embodiments will generally have at least two states. An enabled and active listening state and an enabled and passive listening state. In the active state, the audio detecting devices 112 of the mobile device 110 are active or ON. In the passive listening state the audio detecting devices 112 are inactive or OFF. In one embodiment, the active listening mode of the mobile communication device 110a and application 114 is enabled or activated by the pressing of a button, icon or other activating mode. When the listening application 114 is activated, the audio detection device 112 of the mobile device 110 can also be activated. When the listening application 114 is set to a passive state, the audio detection device 112 can be set to the in-active or OFF state. In alternate embodiments, the state of the audio detection device 112 can set or adjusted independently of the state of the listening application 114.

Mobile device 110a is listening 202 for audio signals. As the mobile device 110a detects 204 audio signals, the mobile device 110a determines 206 whether a detected audio signal comprises one or more certain or pre-determined audio signals, generally referred to herein as a "buzz" signal. A match identifies the "buzz" signal. The term "buzz" as used herein is merely for reference and does not include or imply any particular meaning or function.

In one embodiment, determining 206 a buzz signal comprises comparing the detected signal to a database of stored audio signals. The database can be part of the server system 130 shown in FIG. 1. For example, the mobile device 110a can be configured to send the detected audio signal to the server 130, where the detected signal is compared to the stored audio signals.

In a further embodiment, the detected signal can be sent to an audio signal matching service, or such other facility, where the detected signal can be identified. This can include a search of the Internet, for example.

In one embodiment, once the detected signal is identified 206, it is determined 208 whether there is a notification or other content associated with the identified signal. Generally, each pre-determined or pre-stored audio signal will be associated with a notification, or other content, as is generally described herein. If not, the listening device 110a continues to listen 202 for an audio signal.

If a match is determined 206 and content identified 208, in one embodiment, it is determined 210 whether there are other mobile communication devices 110b-110n that are equipped with the aided passive listening application 114. In one embodiment, the application server 130 referred to in FIG. 1 is configured to identify the mobile devices 110b-110n that are within a pre-determined distance or region near or around the mobile device 110a that are enabled with the aided passive listening application 114.

In one embodiment, the pre-determined distance can be any suitable area or region nearby or around the mobile device 110a. An example would be all mobile devices 110 that are within an approximate 50 meter radius around the mobile device 110a that detected the buzz audio signal. Other distances can be longer or shorter. If for example, the mobile device 110a is in a sport or entertainment venue, all mobile devices 110 enabled with the aided passive listening application 114 that are within the venue can have the notification or other action transmitted thereto. Other regions could include proximity to a store or shopping area, an entertainment or amusement attraction, a town or city, airport or other suitable region, place or area.

When a match between the detected signal and a pre-stored audio signal is identified 208, the notification or content can be delivered 212 to the listening mobile communication device 110a, as well as the non-listening mobile communication devices 110b-110n within the pre-determined distance, as is described herein. In one embodiment, the delivery of the notification to the listening mobile communication device 110a can occur as soon as the detected audio signal, the "buzz" signal, and the associated content is identified. In an alternative embodiment, the notification associated with the identified "buzz" signal is pushed to all of the devices 110a-110n at substantially the same time or within a pre-determined time period.

As is described herein, the mobile communication devices 110a-110n are provided 212 with a notification. In one embodiment, the notification can be associated with an action, or other suitable function, that is configured to be activated and executed 214 by the mobile devices 110a-110n.

In one embodiment, when the notification is acted on or executed 214, the functionality behind the action is performed by or on the mobile device 110a-110n. This can include causing the mobile communication device 110a-110n to open a web page on the display of the device 110a-110n, or launch and on-line game, for example. In the case of a sweepstakes or game event, the event is presented on a display of the mobile device 110a-110n for the user to interact with or play. If the action is in the form of a coupon, the coupon is made available on the mobile device 110a-110n so that the coupon can be used by the user of the mobile device 110a-110n in a desired manner. In one embodiment, the notification or action can include computer readable or machine readable instructions that are configured to be executed by one or more processors of the mobile device 110a-110n that causes the mobile device 110a-110n to carry out the processes described herein.

In one embodiment, the mobile device 110a can be configured to detect audio signals without any user initiation or interaction. This can be referred to as "passive" listening. The passive listening mode of the mobile device 110a can be advantageous in that user interaction is not required. The mobile device 110a can constantly monitor the audio environment for certain audio signals or can also have a timed listening schedule determining when the microphone 112 is the active or ON state, i.e. listening and when the microphone 112 is in the inactive or OFF state.

In one embodiment, the listening application 114 in the mobile communication device 110a can be activated for a pre-determined period of time to cause the device 110a to listen, or have the microphone 112 in the ON or active state. Then the microphone 112 can be turned OFF. For example, in one embodiment, the listening application 114 can activate the microphone 112. The mobile communication device 110a can listen for audio signals until the listening application 114 cause the microphone 112 to be de-activated or turned OFF. The pre-determined period of time can be any suitable time period, or range of time periods, such as 5 seconds, 10 seconds, 30 seconds or longer. It will be understood that the aspects of the disclosed embodiments are not limited by the length of time the listening application 114 is active and that the predetermined time period can be any suitable time period other than what is noted above.

The aspects of the disclosed embodiments only require that one mobile communication device 110, referred to herein as mobile device 110a, be listening and detect the pre-determined audio signal (the aided passive listening application 114 is on and active in mobile device 110a). By knowing the location of the listening mobile communication device 110a, and the location of the other aided passive listening application enabled devices 110b-110n, the content or action associated with the audio signal detected and identified by the mobile device 110a can be automatically pushed to the other mobile communication devices 110b-110n that are within a certain area or distance from the listening mobile communication device 110a.

In one embodiment, the collection of location and position information of the mobile communication device 110, and the transmission of that information to the application server 130 can be controlled by the mobile communication device 110. The updating of this location information can be accomplished using one or more of timed intervals or when there is a significant location change associated with the mobile communication device 110. For example, in one embodiment the mobile communication device 110 can report its location and position information to the application server 130 every 15 minutes or so. In alternate embodiments, any suitable time period or interval can be used such as less than or greater than 15 minutes, including 1, 5, 10, 20 or 30 minutes.

A significant location change update can occur when the position of the mobile communication device 110 changes. For example, if the position changes by approximately 110 meters, a location update can be transmitted. In alternate embodiments, any suitable distance or deviation can be used as the basis for reporting a location change. Preferably, the time interval or location change distance is such to minimize resource usage and battery consumption.

The application server 130 will generally be aware of the position or location of all mobile communication devices 110 with the aided passive listening application 114 of the disclosed embodiments (as long as location services are enabled on the device and the right of usage has been granted to the aided passive listening application 114). The application server 130 can compare and determine distances between the mobile device 110a and the other mobile devices 110b-110n in any suitable manner.

For example, when the mobile communication device 110a detects and identifies a certain audio signal, this is reported back to the application server 130. The mobile communication device 110a can then receive the notification described earlier. The application server 130 also checks to determine where the other mobile communication devices 110b-110n are relative to the mobile communication device 110a. If one or more of the other mobile communication devices 110b-110n are within a pre-determined distance, the one or more mobile communication devices 110b-110n will also receive the notification. The one or more other mobile communication devices 110b-110n receive the notification in the same manner as if they had been listening for and identified the audio signal themselves.

In one embodiment, the aspects of the present disclosure are directed to providing notifications in certain geographic regions or venues. For example, mobile devices 110b-110n that are in range of a shopping area or entertainment venue can receive associated push notifications upon detection by a listening mobile device 110a of an audio signal associated with the venue. In an entertainment venue, it can be desirable to provide notifications to mobile devices 110b-110n located in the entertainment venue. Other applications can include providing mobile devices 110 that are in a certain city, near a certain geographical location, with notifications specific to that location, venues or other facilities near that location, when there is only one listening mobile communication device 110a.

As an example, a user with a mobile device 110a is traveling in a car. The aided passive listening application 114 of the mobile communication device 110a is actively listening and detects audio coming from the radio of the car, such as music or an advertisement. The aided passive listening application 114 of the mobile communication device 110a determines that the detected audio corresponds to a pre-determined one of the audible signals that are stored on the application server 130. Although the aspects of the disclosed embodiments are generally described herein with respect to the mobile communication device 110a identifying the audio signal, the aspects of the disclosed embodiments are not so limited. In one embodiment, the mobile communication device 110a can transmit the detected audio signal to the application server 130, or such other suitable facility, where the identification can take place.

The mobile communication device 110a transmits this audio identification information to the application server 130. In this example, the application server 130 identifies the audio content. The location of other mobile communication devices 110b-110n in an area around or near the mobile communication device 110a is identified. The mobile communication devices 110a-110n receive the relevant notification.

As another example, in one embodiment, the mobile communication device 110a is near a store. The shop is playing a certain melody, sound or other audio. The listening application 114 of the mobile communication device 110a causes the mobile communication device 110a to detect the audio. It is determined, either in the mobile communication device 110a or the server 130, that the detected audio corresponds to one of the pre-determined audio signals that are stored in a memory of the server 130. In one embodiment, the server 130 can be configured to search for a match to the detected audio, such as over the Internet. The notification associated with the detected audio is identified. The application server 130 identifies other mobile communication devices 110b-110n that are in a proximity to the store and sends the notification to all the mobile communication devices 110a-110n.

As another example, there are 10 people in a room within 20 meters from each other. All have their phones 110 with the listening application 114 installed thereon. As soon as one phone 110a detects an audio, this phone 110a will report this back to the server 130. In addition to phone 110a, all the other phones 110b-110n will receive the same notification as if these phones 110b-110n would also have detected the audio. The system of the disclosed embodiments is "intelligent" enough to avoid double notifications, so as soon as one notification has been sent (either after audio detection or because of proximity) then for a set time, i.e. 5 or 10 minutes, the same notification will not be sent or displayed again. This can include keeping track of the phones 110 and the notifications that are sent to the phones within a pre-set or determined time period.

Figure 3:
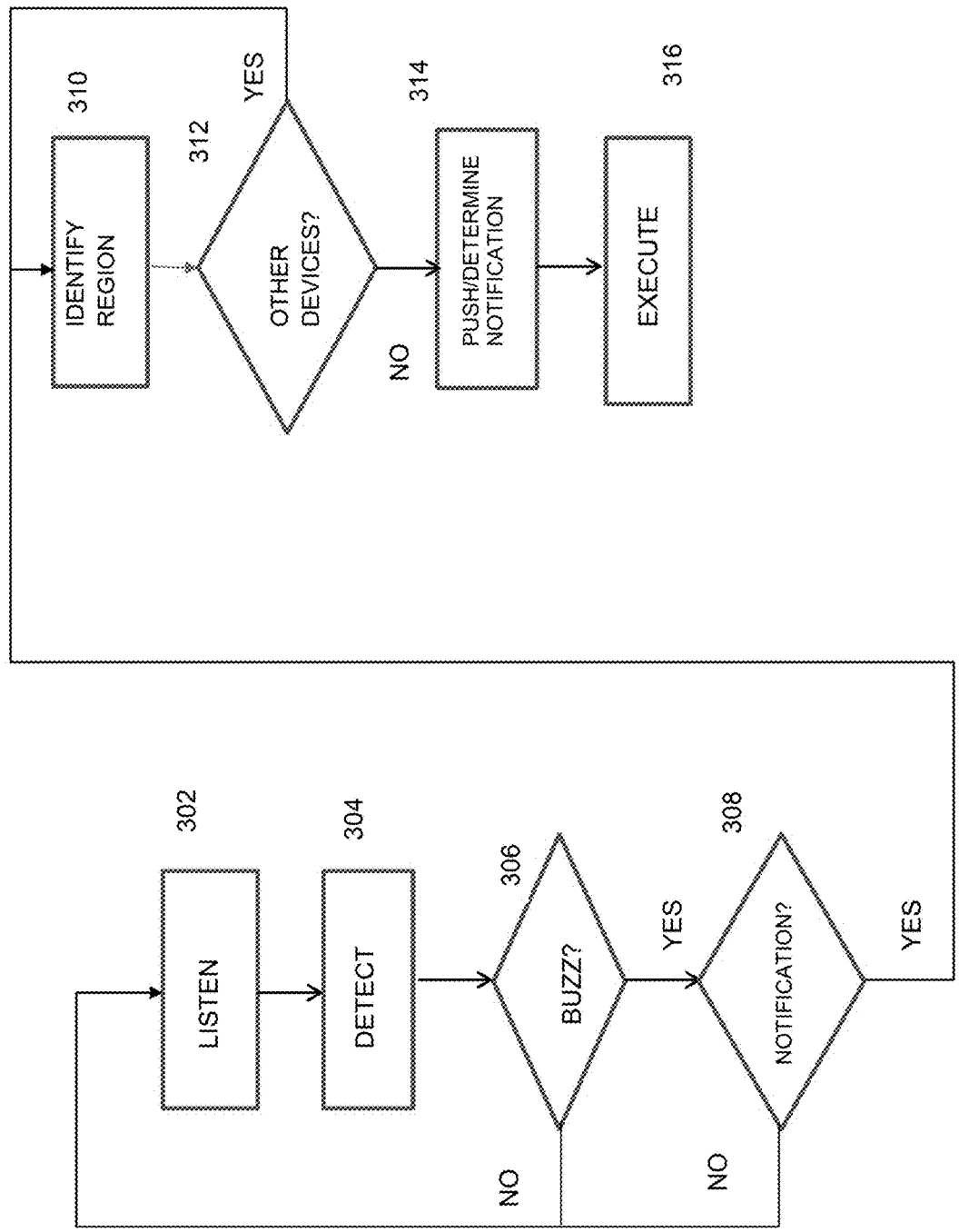
FIG. 3 is a flowchart of another embodiment of an exemplary process flow incorporating aspects of the present disclosure.

FIG. 3 illustrates another example of an aided passive listening process including aspects of the disclosed embodiments. In this example, at least one listening application enabled mobile device 110a is listening 302 for audio signals. An audio signal is detected 304. It is determined 306 whether the detected audio signal is, or comprises, a pre-determined audio signal. In one embodiment, determining if the detected audio signal is the pre-determined audio signal comprises comparing the detected audio signal to one or more pre-stored audio signals. If a match is found, the detected audio signal is identified as the pre-determined audio signal.

Once the detected audio signal is identified 306 it is determined 308 whether content or an action is associated with, or otherwise linked to the identified signal. In one embodiment, this determination 308 can include the application server 130 of FIG. 1 identifying in its database or memory, a link or match between the identified signal and an action stored in the database or memory.

In one embodiment, once it is determined 308 that there is an action associated with the identified signal, a location or position of the listening mobile device 110a is identified. The system 100 or application server 130 of FIG. 1 determines 312 if there are other aided passive listening enabled mobile devices 110 within a pre-determined region around or near the listening mobile device 100a. The other listening enabled devices 110b-110n in the determined region do not have to be listening at the time. Once all of the other listening enabled devices 110b-n in the area are identified 312, the action or notification that is associated with or linked to the identified signal is transmitted or "pushed" 314 to each of the listening enabled mobile devices 110b-n in the identified region. The action can then be executed 316 in a suitable fashion on or by the receiving mobile device 110a-110n as is otherwise described herein. Thus, in this embodiment, even though the listening application on one or more of the mobile devices 110b-n may not have picked up or detected the audio signal, the one or more mobile devices 110b-n will receive the benefit of the action linked with the signal since the one or more mobile devices 110b-n are within a pre-determined region associated with at least one listening mobile device 110a.

Figure 4:
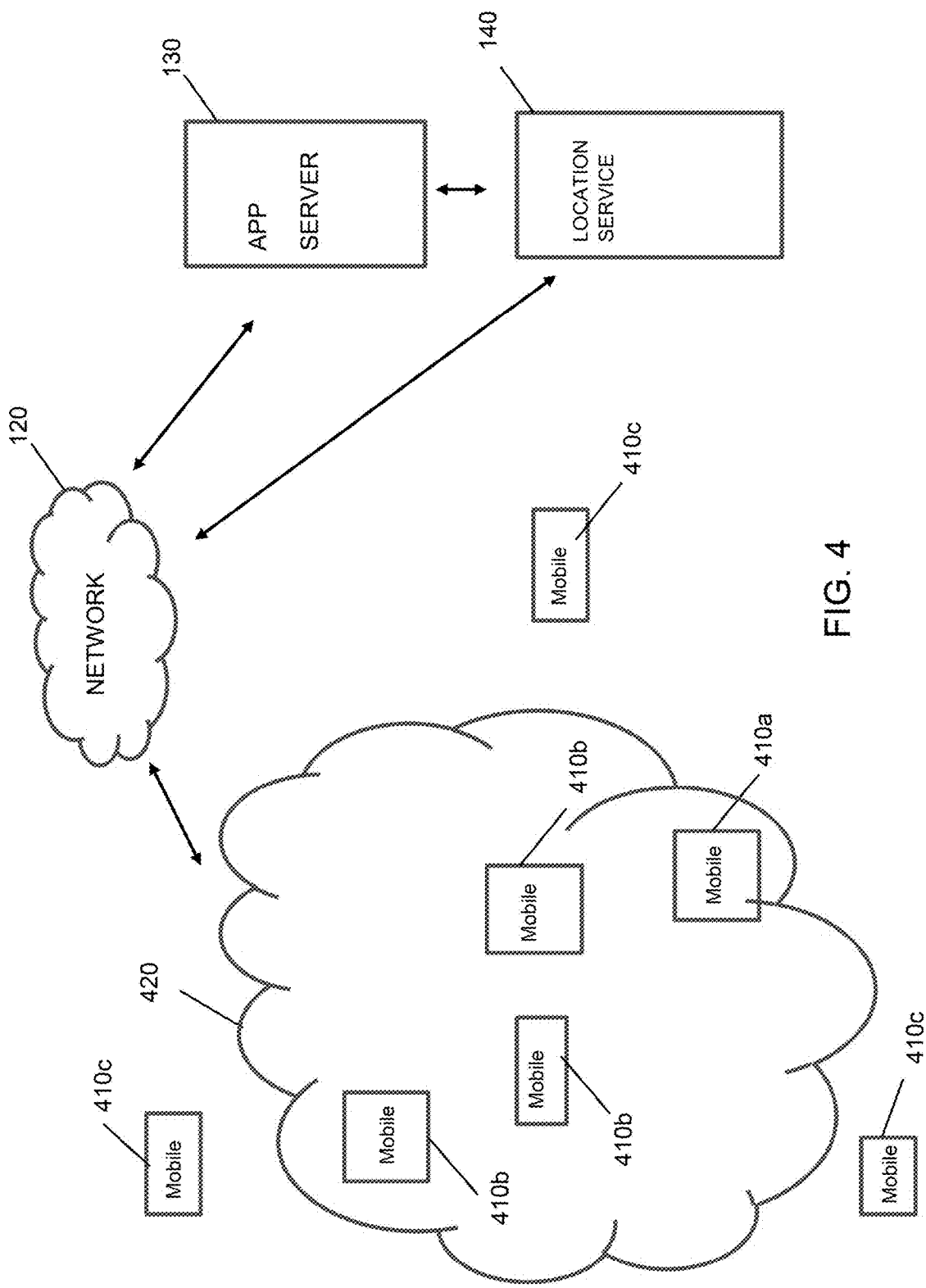
FIG. 4 is a schematic diagram of one exemplary application of the aspects of the present disclosure.

FIG. 4 illustrates one example of providing the notification or action to only certain ones of the aided passive listening application equipped mobile communication devices 110 shown in FIG. 1. In this example, mobile communication devices 410b are within the pre-determined distance or range of the listening mobile communication device 410a and only mobile communication devices 410a and 410b receive the action. Even though the mobile communication devices 410c are equipped with the aided passive listening application 114 of FIG. 1, and are communicating with the application server 130, they are outside the pre-determined range 420, and do not receive the notification. Thus, the application server 130 is configured to selective identify and transmit the notification to only certain ones of the mobile communication devices 410a, 410b and 410c.

Figure 5:
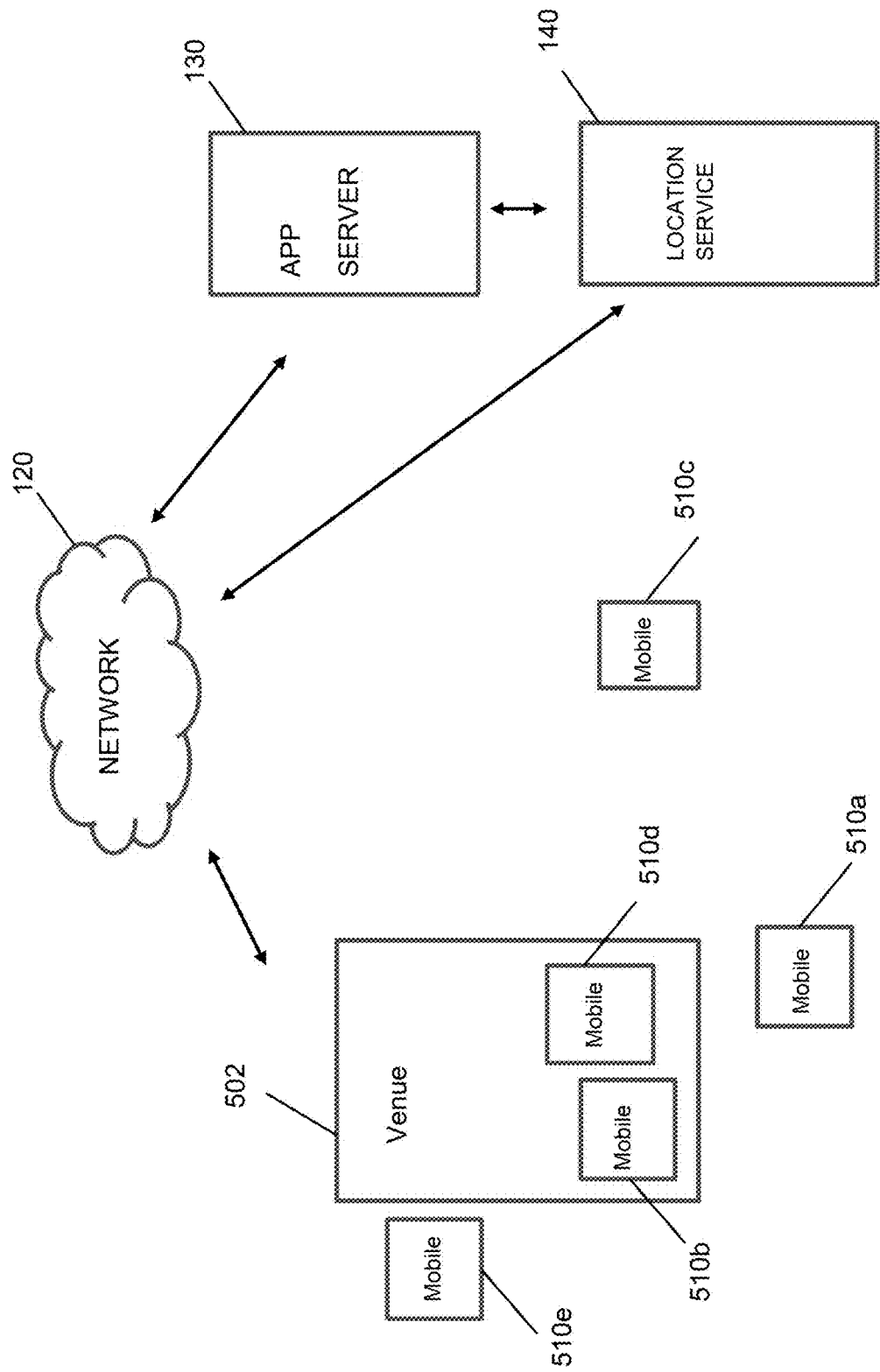
FIG. 5 is a schematic diagram of another exemplary application of the aspects of the present disclosure.

FIG. 5 illustrates another example, this time in conjunction with a venue 502 such as a stadium. Mobile communication device 510a is listening and is in, or is in proximity to, the venue 502. Mobile communication device 510a detects and identifies an audio signal as a pre-determined audio signal. This information is transmitted to the application server 130. The application server 130 generates the notification from the content stored on the application server 130, or such other storage. The application server 130 then determines which of the other listening application equipped mobile devices 510b, 510c, 510d and 510e are in proximity to the venue 502. Only those mobile communication devices 510b, 510d and 510e that are within or in close proximity to the venue 502 receive the notification. The mobile communication device 510c is not in proximity or a predetermined range of the venue, and does not receive the notification.

Figure 6:
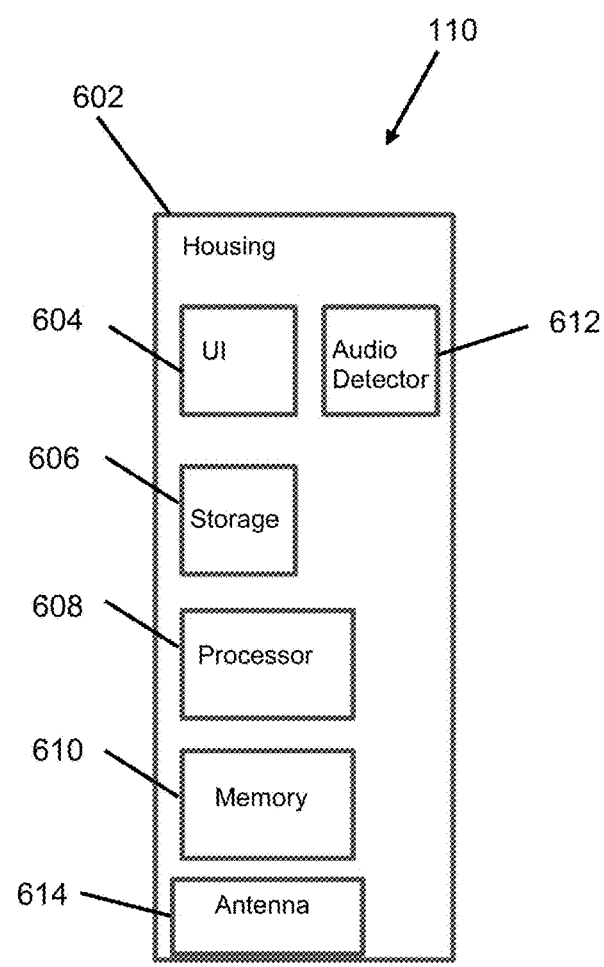
FIG. 6 is a schematic block diagram of a mobile communication device incorporating aspects of the disclosed embodiments.

FIG. 6 illustrates an exemplary mobile communication device 110 incorporating aspects of the disclosed embodiments. In this example, the mobile communication device 110 includes a housing 602, a user interface 604, an application storage device 606, a processor 608, a memory 610, an optional audio detecting device 612 and an antenna unit 614. The user interface 604 can comprise one or more of an audio device and visual display. The application storage unit can include the listening application 114 described herein. The various components of the mobile communication device 110 will be coupled together as is generally understood, using for example, a common bus architecture.

Figure 7:
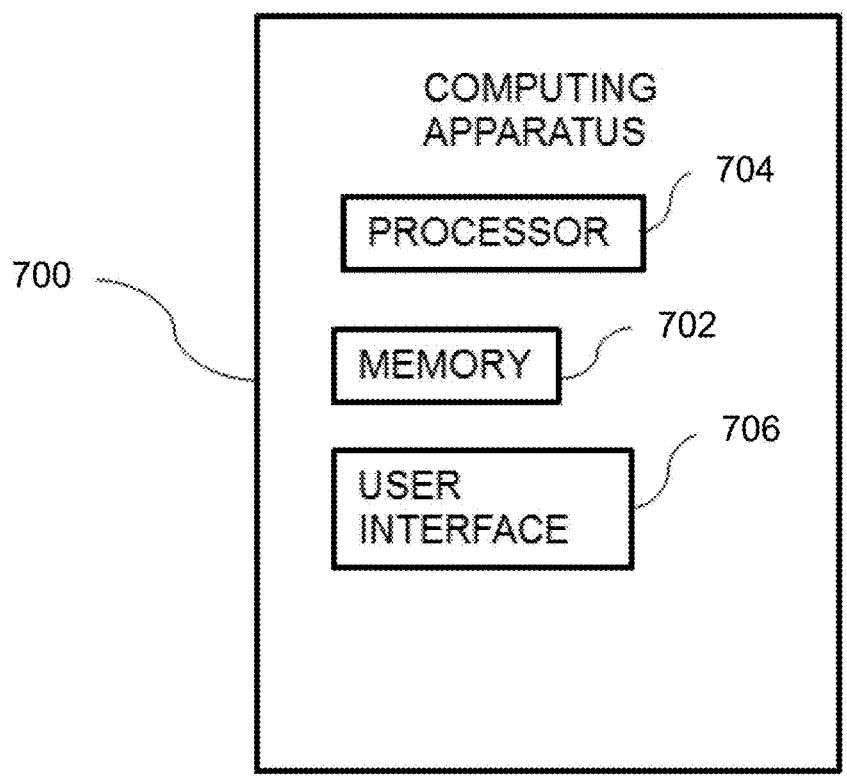
FIG. 7 is a schematic block diagram of an exemplary apparatus that can be used to practice aspects of the disclosed embodiments.

Referring to FIG. 7, in at least one exemplary aspect, each of the user devices, servers and other disclosed devices and systems may be implemented using an instance or replica of the computing apparatus 700 or may be combined or distributed among any number of instances or replicas of computing apparatus 700. The user devices can comprise computing devices, mobile communication devices, wireless communication devices, smart phones, navigation equipped or enabled devices, tablets and any other such similar or compatible devices.

The computing apparatus 700 may include computer readable program code stored on at least one non-transitory computer readable medium 702 for carrying out and executing the processes and methods described herein. The computer readable medium 702 may be a memory of the computing apparatus 700. In alternate aspects, the computer readable program code may be stored in a memory external to, or remote from, the apparatus 700. The memory may include magnetic media, semiconductor media, optical media, or any media which is readable and executable by a computer. Computing apparatus 700 may also include a processor 704 for executing the computer readable program code stored on the at least one computer readable medium 702. In at least one aspect, computing apparatus may include one or more input or output devices, generally referred to as a user interface 706, similar to the user interface described above, which may operate to allow input to the computing apparatus 700 or to provide output from the computing apparatus 700, respectively. The user interface may include one or more of a display, touch screen, buttons, audio input device and audio output device.

The aspects of the disclosed embodiments advantageously address the technical problems of high battery consumption of a mobile device and pre-empted use of one or more functions of a mobile device that might otherwise be associated with a listening application. As noted, a listening process requires the active use of certain components of the mobile device, such as the microphone. The listening process will increase battery consumption and the listening process can block the use of the microphone for other functions. The aided passive listening system of the disclosed embodiments enables all mobile devices in a pre-determined area to receive actions linked to an audio signal whether or not the mobile device is listening. As long as one mobile device is listening and detects the pre-determined audio signal, all other listening enabled mobile devices in the pre-determined area will also receive the action.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of providing a notification to a plurality of mobile communication devices, the method comprising:
   detecting an audio signal in an audio detecting unit of a first mobile communication device;
   comparing the detected audio signal to a plurality of audio signals stored in a memory device;
   identifying an audio signal from the plurality of stored audio signals that is a substantial match to the detected audio signal;
   identifying content associated with the identified audio signal;
   identifying one or more mobile communication devices with an aided passive listening application installed thereon; and
   transmitting the notification to the first mobile communication device and the one or more identified mobile communication devices.

2. The method of claim 1, comprising disabling an audio detection device in the identified one or more mobile communication devices.

3. The method of claim 1, comprising the first mobile communication device and the one or more identified mobile communication devices executing an action associated with the notification.

4. The method of claim 3, wherein execution of the action comprises the execution of machine readable instructions included in the notification in a processor of the first mobile communication device and the one or more identified mobile communication devices.

5. The method of claim 1, comprising identifying a location of the one or more mobile communication devices using a location service of the one or more mobile communication devices, determining if the location of the one or more mobile communication devices is within a pre-determined distance of the first mobile communication device, and transmitting the notification to the one or more mobile communication devices within the pre-determined distance.

6. The method of claim 5, wherein identifying the location of the one or more mobile communication devices comprises reading location data of the one or more mobile communication devices from a global positioning unit of the one or more mobile communication devices.

7. The method of claim 1, wherein the notification includes non-transitory machine readable instructions that when executed in a processor of the first mobile communication device or the one or more mobile communication devices causes a display on a user interface of a coupon, an advertisement or a game.

8. The method of claim 1, wherein the notification includes non-transitory machine readable instructions that when executed in a processor of the first mobile communication device or the one or more mobile communication devices presents a display of a link to a webpage on a user interface, wherein activation of the link causes the first mobile communication device or the one or more mobile communication devices to open the web page on the user interface.

9. The method of claim 1, wherein the aided passive listening application installed on the first mobile communication devices causes the audio detecting unit to be in an active listening state for a first pre-determined period of time and then in a non-active state for a second pre-determined period of time.

10. An aided passive listening system, comprising:
    a listening mobile communication device;
    a server system communicatively coupled to the listening mobile communication device;
    wherein the listening mobile communication device comprises a processor and an audio sensor configured to detect an audio signal;
    wherein the processor in the listening mobile communication device is configured to execute machine readable instructions to identify the detected audio signal and identify one or more other mobile communication devices within a pre-determined distance of the listening mobile communication device that are enabled with a listening application; and
    wherein the server system is configured to communicate a notification associated with the identified audio signal to the listening mobile communication device and the one or more other mobile communication devices within the pre-determined region.

11. The system of claim 10, wherein the listening mobile communication device and the one or more other mobile communication devices are configured to receive the notification and execute an action associated with the notification.

12. The system of claim 10, wherein the server system is configured to identify a location of the one or more other mobile communication devices.

* * * * *